United States Patent [19]

Lee

[11] Patent Number: 4,969,493

[45] Date of Patent: Nov. 13, 1990

[54] SUPPLEMENTARY TIRE INFLATOR

[76] Inventor: Tzal-Lin Lee, Fl. 2, No. 6, Lane 160, Fu Hsing S. Rd., Sec. 2, Taipei, Taiwan

[21] Appl. No.: 297,974

[22] Filed: Jan. 17, 1989

[51] Int. Cl.[5] .................. B60C 29/06; B60C 23/02
[52] U.S. Cl. ........................... 141/38; 141/95;
141/98; 141/329; 141/382; 141/384; 73/146;
137/227; 137/231; 222/5
[58] Field of Search ............... 222/5; 73/146.2, 146.8, 73/146

[56] References Cited

U.S. PATENT DOCUMENTS

| | | | |
|---|---|---|---|
| 1,786,103 | 12/1970 | Baird et al. | 137/228 |
| 2,001,233 | 5/1935 | Anderberg | 137/228 |
| 2,498,596 | 2/1950 | Wallach | 141/38 X |
| 2,761,601 | 9/1956 | Van Vooren | 141/38 X |
| 2,812,783 | 12/1957 | Bofogle | 141/38 |
| 3,448,779 | 6/1969 | Horwitt | 141/38 |
| 3,809,288 | 4/1974 | Mackal | 222/5 |
| 3,996,957 | 12/1976 | Goldish et al. | 137/224 |
| 4,054,163 | 10/1977 | Brown, Jr. et al. | 141/38 X |
| 4,116,245 | 9/1978 | Ayers | 141/98 |
| 4,168,015 | 9/1979 | Robinette | 141/38 X |
| 4,489,855 | 12/1984 | Boetger | 222/5 |
| 4,658,869 | 4/1987 | Soon-Fu | 141/98 |
| 4,662,412 | 5/1987 | Swallert | 141/38 X |

FOREIGN PATENT DOCUMENTS

| | | | |
|---|---|---|---|
| 129404 | 3/1932 | Austria | 141/38 |
| 509789 | 3/1952 | Belgium | 141/38 |
| 1113378 | 8/1961 | Fed. Rep. of Germany | 137/228 |
| 3205264 | 8/1983 | Fed. Rep. of Germany | 141/38 |
| 3237350 | 4/1984 | Fed. Rep. of Germany | 141/19 |
| 13574 | 5/1911 | France | 141/38 |
| 0136718 | 11/1978 | Japan | 141/38 |
| 332795 | 7/1930 | United Kingdom | 137/228 |

Primary Examiner—Ernest G. Cusick
Attorney, Agent, or Firm—Ho & Chu International Patent and Trademark Office

[57] ABSTRACT

A manually-operated device for safely inflating automotive vehicle tires. A pressurized gas cylinder is connected to a manual valve for delivery of pressurized gas to a vehicle tire. The gas pressure is safely controlled (regulated) by a stepped piston that is slidably arranged in a vent chamber. A small diameter rod section of the piston is aligned with a valve seat in the main flow passage. Pressure rise on the large diameter section of the piston causes the rod section to temporarily interrupt the main gas flow. Gas is vented around the large diameter section of the piston to enable the rod section to move away from the associated valve seat, thereby permitting gas flow to resume through the main passage.

1 Claim, 3 Drawing Sheets

SUPPLEMENTARY TIRE INFLATOR

BACKGROUND OF THE INVENTION

This invention relates to a manually-operated device for inflating a vehicle tire. For safe driving, it is very important to keep the car tires at a suitable pressure determined according to local climate, car model, and regular driving speed. If the car tire pressure is excessively low, while driving under high speed, the friction resistance will be increased, and therefore, steering control will be more difficult. Also, the car tires will tend to wear prematurely. When a tire (high-speed tire) is pierced by a nail to exhaust, the tire should be replaced by a spare tire. If no suitable spare tire is available, the driver will have to inflate the tire by oneself or contact a maintenance shop for tire repair or replacement.

A car maintenance shop will have a pressure gauge for checking the tire pressure. However, the ordinary car driver will not have a pressure gauge to accurately control tire pressure while using a tire inflator to inflate the tires. In consequence, car tire pressure may be over or below the normal optimum range when the car owner inflates the tire.

SUMMARY OF THE INVENTION

The present invention is related to a supplementary car tire inflator comprised of a high-pressure $CO_2$ cylinder, a manually-operated valve, a stabilivolt output device, and an outlet valve, wherein said stabilivolt output device is adapted to control the air pressure during inflation of the tire so as to prevent the tire from being blown out due to excessively high pressure. The outlet valve includes a pressure exhaust valve to control the air pressure applied to the tire. Therefore, the tire pressure can be controlled within a suitable range while using the present invention to inflate a tire.

While driving, if a car tire is pierced by a nail, the present invention can be utilized to inflate the tire for continuous driving for a reasonable period of time so as to let the driver have enough time to look for a car maintenance shop to patch the tire.

DETAILED DESCRIPTION OF THE PREFERRED EMBODIMENT

Figure 1:
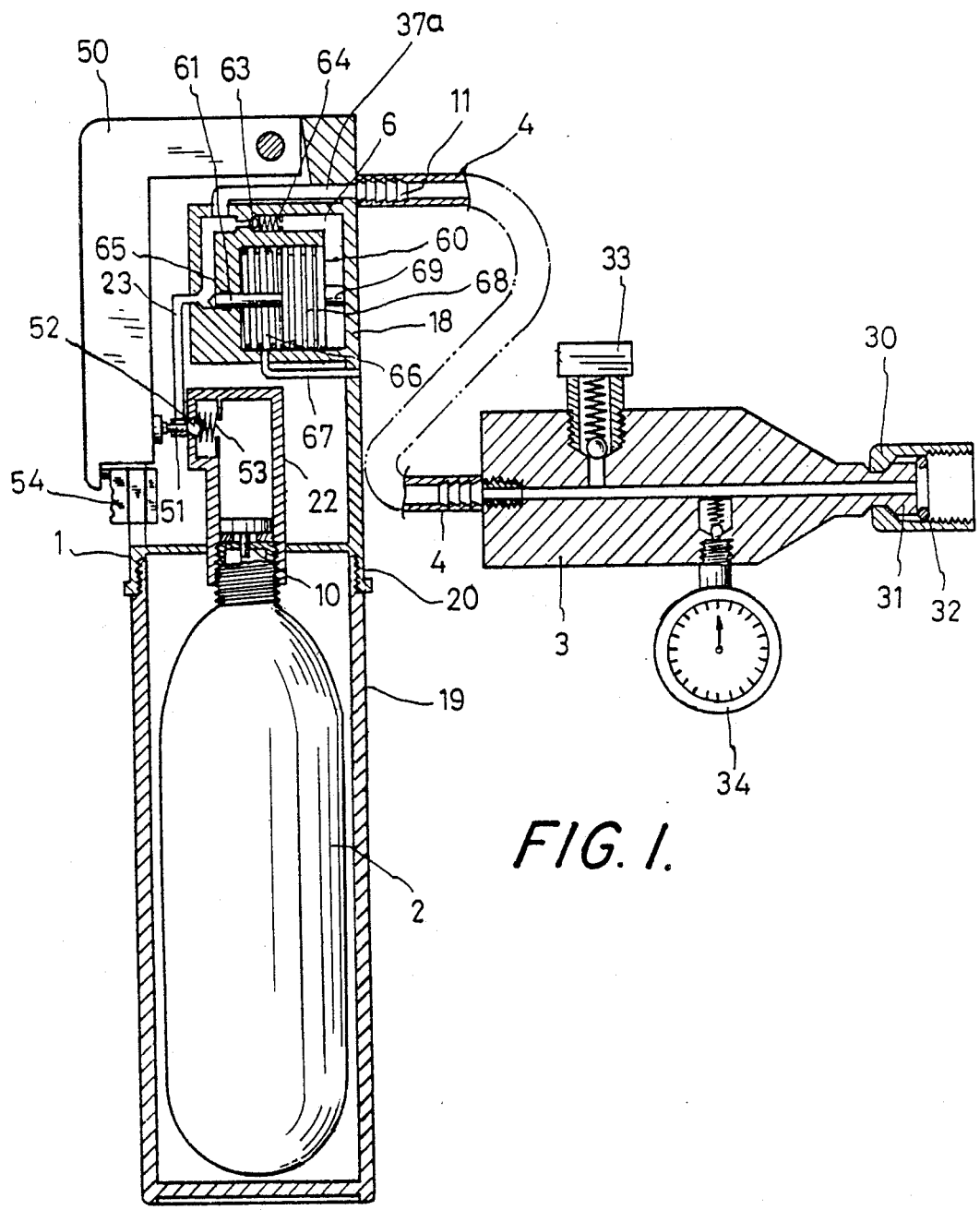
FIG. 1 is a sectional view of the supplementary tire inflator constructed according to the present invention.

Referring in greater detail to the drawings, FIG. 1 shows a supplementary tire inflator comprised of a housing 1, a $CO_2$ cylinder 2, a manually-operated valve 50, 52, a stabilivolt device 6, and an output device 3.

Figure 2:
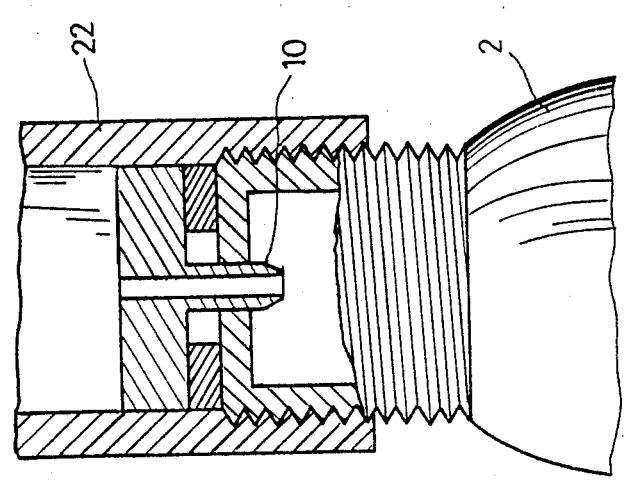
FIG. 2 is an elarged schematic drawing of a $CO_2$ cylinder used in the FIG. 1 structure, showing its pierced condition.

The said housing 1 is comprised of an upper shell 18 connected with a lower shell 19 by means of a screw joint indicated by numeral 20. A high-pressure $CO_2$ cylinder 2 is disposed within the lower shell for engagement by a needle tube 10 designed to pierce through the top end surface of the $CO_2$ cylinder (as shown in FIG. 2). Cylinder 2 will be screwed onto the upper shell before the lower shell is screwed onto the upper shell. As cylinder 2 threads into the associated threads in the upper shell the hollow needle 10 pierces the end wall of the cylinder. Needle 10 acts as a fluid connector between cylinder 2 and a passage structure 22 in shell 18.

The upper shell serves as a mounting structure for a manually-operated valve 50, 52 and the stabilivolt device. A hose 4 is connected to the coupling 11 of the said stabilivolt device for communication of the said stabilivolt device with the output device 3. The output device 3 is adapted to screw onto an intlet valve, not shown, of a car tire.

Figure 3:
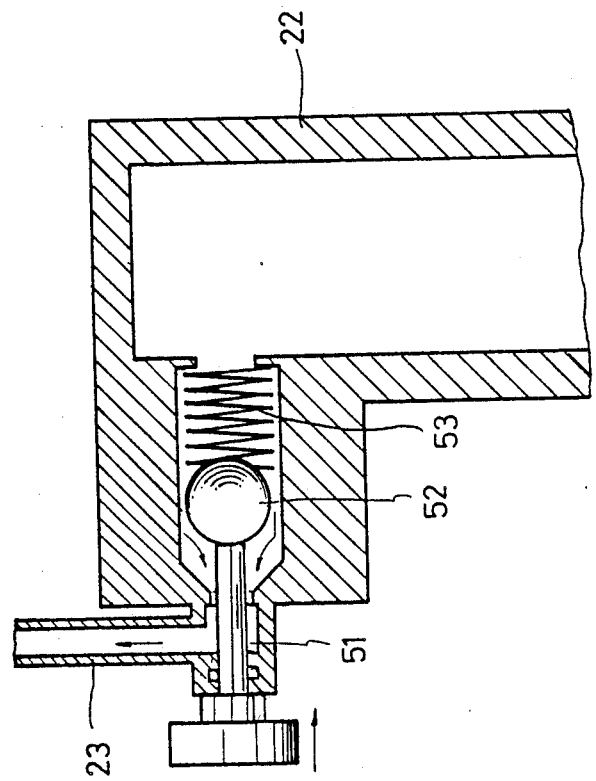
FIG. 3 is an enlarged sectional view of a manually-operated valve used in the FIG. 1 structure.
Figure 5:
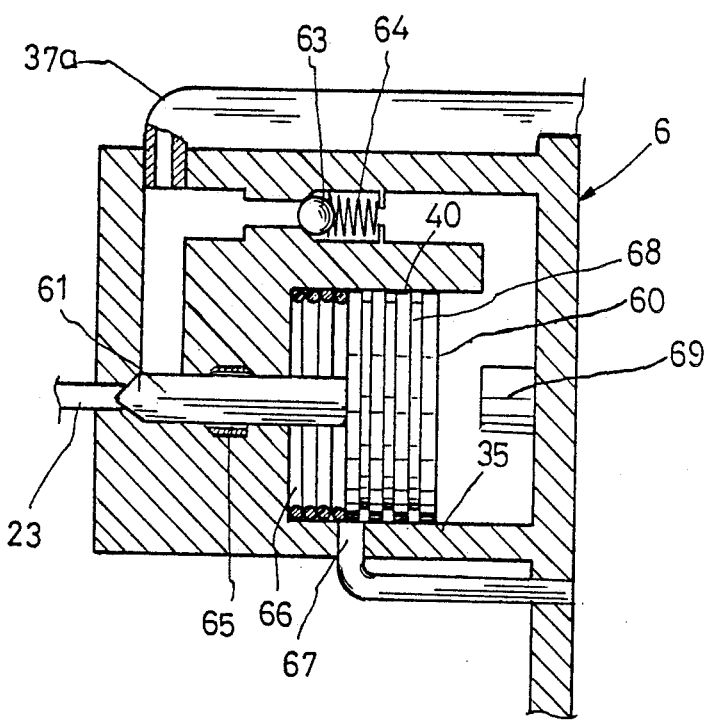
FIG. 5 illustrates the stabilivolt device of FIG. 4 in its closed condition.

The manually-operated valve is comprised of an L-shaped drive plate 50, a push rod 51, and a check valve having a spring 53 and a steel ball 52. The L-shaped drive plate 50 is designed to drive the push rod 51 to push the steel ball 52 away from the valve port as shown in FIG. 3, so as to let $CO_2$ gas flow through the associated passage 23 into the stabilivolt device 6. There is provided a slide block 54 to stabilize the L-shaped drive plate 50 so as to provide maximum safety. The stabilivolt device 6 includes a stepped piston 60, and a constant-pressure control valve comprised of a spring 64 and a steel ball 63 (FIGS. 4 and 5).

The cross sectional area of piston 60 is different at its opposite ends; i.e. the main body of the piston 60 has a relatively great cross sectional area, whereas the rod portion 61 of the piston has a lesser cross sectional area. The large diameter section of the stepped piston is slidably mounted within a cylindrical vent chamber 35 that contains a spring 66 therewithin. The rod portion of the piston extends through the vent chamber toward a valve seat 36 in the main flow passage.

A piston ring 65 is mounted on the separating (isolation) wall between the vent chamber 35 and the main flow passage 37. Spring 66 is set within the range of the stroke of piston 60, and a pressure outlet tube 67 is provided to communicate the vent chamber with atmosphere. There is also provided an abutment member 69 to limit motion of piston 60 away from piston ring 65. Control valve 63 is located in a control passage 38 that leads from the main flow passage 39 to the large end face of piston 60. A flow tube 37a connects a passage 37 to coupling 11 (FIG. 1).

Figure 4:
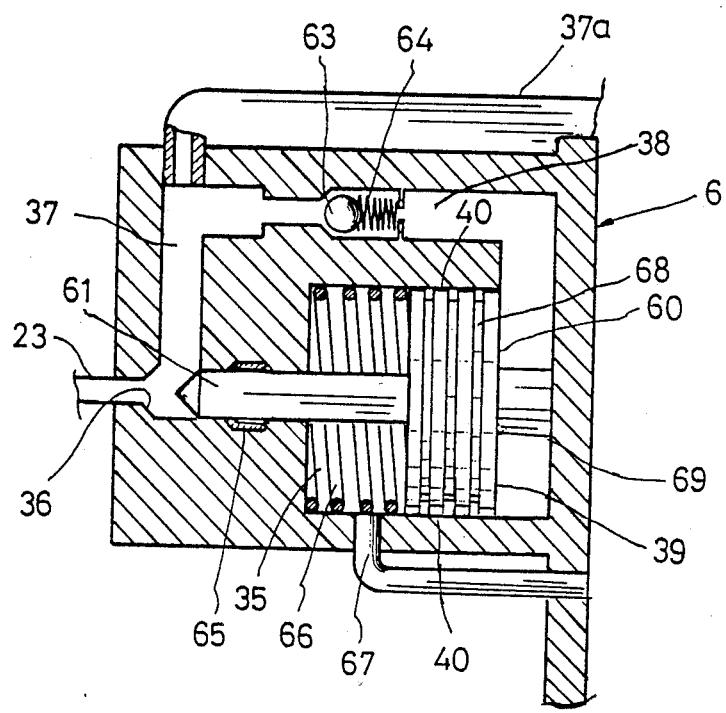
FIG. 4 is an elarged sectional view of the stabilivolt device used in the FIG. 1 structure.

In the stabilivolt device, when the output pressure of the $C0_2$ gas exceeds the pre-determined range for the said resilient steel ball 63, the steel ball 63 is forced to break away from the associated valve port, as shown in FIG. 4. The control gas flows through passage 38 against the end face of the large diameter section of piston 60 to apply a force thereon.

Assuming that:

Output pressure of the gas from the $CO_2$ cylinder is P1; Compression strength of the steel ball 63 is P2; Sectional area of both ends of the piston 60 are A, aA (a>1); thus, the pressure the large diameter section of piston 60 is bearing shall be P1−P); the total pressure the piston rod 61 is bearing shall be P1×A; the total pressure the piston body 60 is bearing shall be (p1−P2) ×aA;

If (P1−P2) aA−P1A>0 thus (P1−P2) a−P1>0 thus P1>(a P2)/(a−1)

Thus, the piston will be displaced to cause rod section 61 of the piston to engage the associated valve seat 36, to thus block flow through the main passage 37 as shown in FIG. 5. When the main flow passage is blocked by the rod section of piston 60, gas will be exhausted from the end face of the large diameter section of the piston body 60 through a peripheral gap 40 between the piston and the wall that forms the vent chamber 35. Gas in the vent chamber 35 will be exhausted to the atmosphere via pressure outlet tube 67. Therefore, the inner pressure of the said stabilivolt device remains at a satisfactory low level, and the gas from the $CO_2$ cylinder is allowed to push away the piston 60 to let the conduit be opened (as shown in FIG. 4). The process is repeated again and again to secure the output air pressure below a fixed range. Further, a plurality of circular grooves 68 are made on the piston 60 to stabilize the stroke and to minimize the mechanical resistance (resistance of friction).

The output device 3 includes an air valve 31 having a nut 30 set thereon with an 0-ring 32 set therebetween. When the nut 30 is connected to the inlet valve of a car tire, the 0-ring 32 is adapted to prevent any air leakage. The output device 3 may be arranged to provide an exhaust valve 33 and a pressure gauge 34. If tire pressure is over the fixed range of the said stabilivolt device, the inner pressure of the tire may be exhausted by means for said exhaust valve 33 to reach a preferred level measured by reading from the said pressure gauge 34.

According to the present invention, the gas from the $CO_2$ cylinder is released to inflate a car tire under suitable pressure controlled by the said stabilivolt device. Therefore, explosion of car tires due to suddenly increasing the tire pressure can be effectively prevented. The device constructed according to this invention is very practical for inflation of tires under an emergency case when the car tire is pierced or exhausted; the fixed air pressure range for the stabilivolt device is slighlty higher than tire pressure, and the fixed air pressure range for the exhaust valve of the output device is equal to the tire pressure.

I claim:

1. A supplemental tire inflator comprising a pressurized gas cylinder; means forming a tire-inflation passage (22, 23, 37) extending from said pressurized cylinder; a manually operated valve (50, 52) controlling gas flow through said tire-inflation passage; a valve seat (36) in said tire-inflation passage downstream from said manually-operated valve; and means (at 6) for regulating the pressure of the gas after passage across the valve seat; said pressure regulating means comprising an atmospheric vent chamber (35) isolated from said tire-inflation passage; a stepped piston (60) that includes a large diameter piston section slidably mounted in said vent chamber, and a small diameter piston section (61), extending through and beyond said vent chamber; a pressure control passage (38) communicating with said tire-inflation passage downstream from said valve seat (36); a pressure-reducer valve means (63, 64) in said pressure control passage; said large diameter piston section having an end face exposed to said pressure control passage; said small diameter piston section having an end face axially aligned with said valve seat for interrupting gas flow therethrough when there is a pressure build-up in the pressure control passage; and means (at 40) establishing a leakage path around the large diameter piston section for temporarily relieving the pressure on the end face of said large diameter piston section.

* * * * *